Patented June 12, 1945

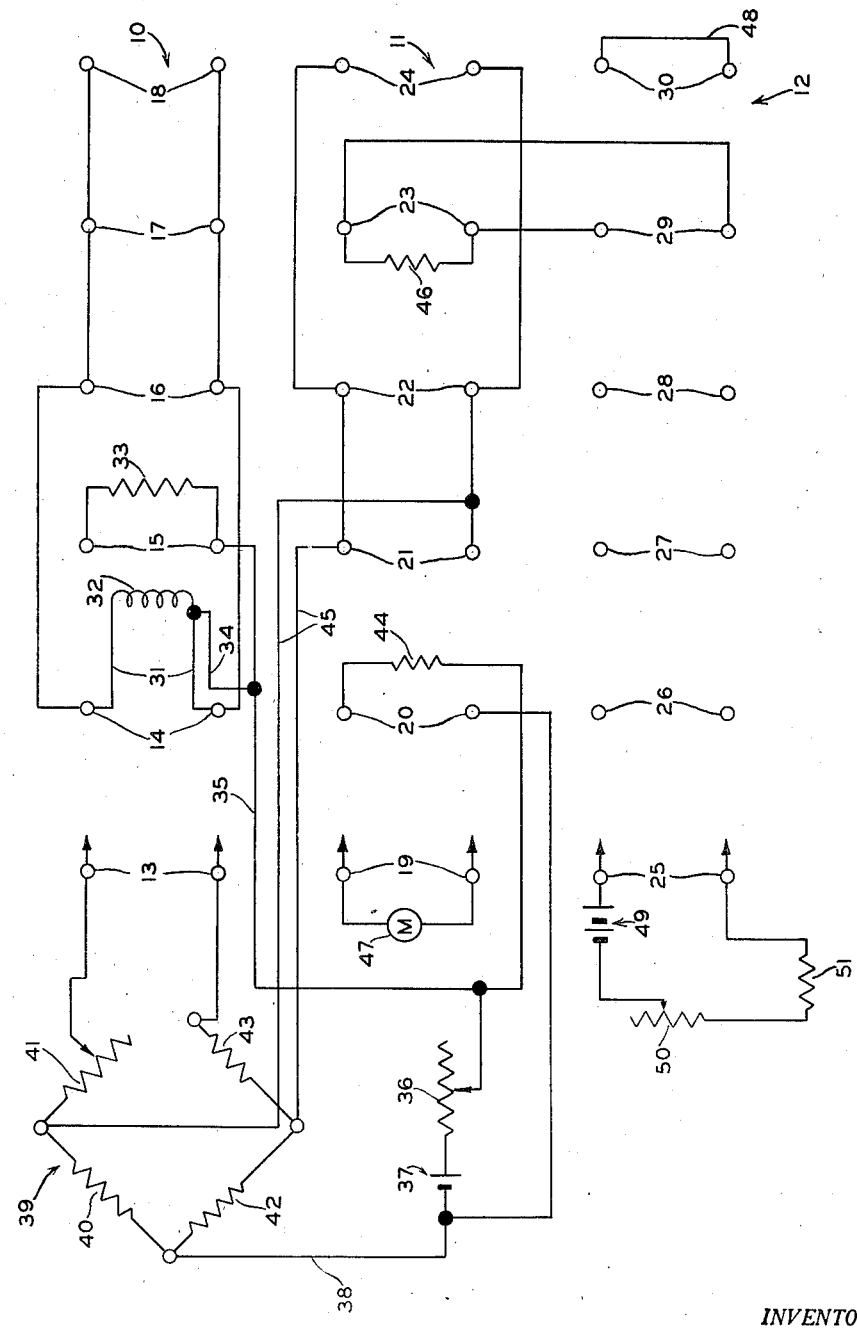
June 12, 1945. L. HILLMAN 2,377,884
MEANS FOR MEASURING WIND VELOCITY
Filed Oct. 9, 1943
INVENTOR.
LEON HILLMAN
BY
William D Hall
Attorney.

2,377,884

UNITED STATES PATENT OFFICE 2,377,884

MEANS FOR MEASURING WIND VELOCITY

Leon Hillman, New York, N. Y.

Application October 9, 1943, Serial No. 505,647

1 Claim. (Cl. 73—204)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to means for measuring wind velocity.

Instruments for similar purposes have heretofore been heavy and bulky, costly to manufacture, and more or less complicated in their electrical circuits.

It is therefore the main object of the present invention to improve such instruments by providing a circuit employing standard parts, which are compact, of light weight, and easy and inexpensive to manufacture, assemble, and operate.

These highly desirable characteristics are attained in the present invention through the use of a well known phenomenon, namely, that the resistance of a conductor is a function of the temperature thereof, this phenomenon being utilized in the following manner:

A low temperature coefficient of resistance element is inserted in a fundamental bridge circuit and the latter is adjusted so that a reference current flows therein corresponding to the mean of the temperature range to be measured. Then, a thermally responsive element, such as a high temperature coefficient of resistance element, having a resistance, at said mean temperature, equal to that of said first-named element, is substituted for the latter in said bridge circuit. By now exposing the high temperature coefficient of resistance element to the medium the temperature of which is desired, the bridge resistance becomes automatically adjusted to cause a current flow dependent upon said temperature. By employing a properly calibrated scale in association with the current indicating device, a reading directly in terms of temperature may be had.

When it is desired to obtain wind velocity, the bridge circuit resistance, with the thermally responsive element connected therein, is balanced to obtain zero deflection of the current indicating device. This operation is carried out in the presence of the wind to be measured and compensates for the ambient temperature. Thereafter, the high temperature coefficient of resistance element is heated to a temperature which, if the instrument were in still air, would so unbalance the bridge as to cause full scale deflection of the current indicating device. However, inasmuch as the thermally responsive element is exposed to the wind the velocity of which is desired to measure, said element becomes cooled, its resistance becomes lowered, and a bridge current flows corresponding to the extent of the cooling. By properly calibrating the current indicating device, the cooling power of the wind may be read directly in terms of velocity.

In the accompanying specification I describe, and in the annexed drawing show, an illustrative embodiment of the present invention. It is, however, to be clearly understood that I do not wish to be limited to the details herein shown and described for purposes of illustration only, inasmuch as changes therein may be made without departing from the true spirit and scope of the present invention, as expressed in the claim hereto appended.

In said drawing, the single figure is a schematic diagram of a temperature and velocity measuring device assembled in accordance with the principles of the present invention.

Referring now more in detail to the aforesaid illustrative embodiment of the present invention, with particular reference to the drawing illustrating the same, the numerals 10, 11, and 12 generally designate three contact channels of a selector switch; the first channel including one pair of movable contacts 13, and five pairs of fixed contacts 14 to 18, inclusive; the second including one pair of movable contacts 19, and five pairs of fixed contacts 20 to 24, inclusive; and the last including one pair of movable contacts 25, and five pairs of fixed contacts 26 to 30, inclusive. The movable contacts 13, 19, and 25 are preferably ganged.

Referring more particularly to the first channel 10, the contacts 14 are connected through conductors 31 to a thermally responsive element, such as a high temperature coefficient of resistance coil 32 intended to be remotely situated from the remainder of the instrument so as to permit its ready exposure to the medium the temperature or velocity of which it is desired to determine.

The contacts 15 have connected therebetween a low temperature coefficient of resistance element 33, and the contacts 16, 17, and 18 are connected in parallel with the contacts 14.

One terminal of the element 32 and one of the contacts 15 are connected, through conductors 34 and 35 and a current limiting variable resistor 36, to one terminal of a source 37 of D. C., the remaining terminal of the latter being connected through a conductor 38 to the input of a fundamental bridge circuit 39.

The bridge circuit comprises two parallel arms, one including a fixed resistor 40 and a variable resistor 41 in series, and the other including two fixed resistors 42 and 43 connected in series with one of the movable contacts 13, the remaining movable contact 13 being connected with the adjustable arm of the variable resistor 41.

Referring now more specifically to the channel 11, the contacts 20 are connected to the source 37 of D. C. through a high resistor 44; the contacts 21 are connected, through conductors 45, across the midpoints of the bridge circuit 39; the contacts 22 and 24 are connected in parallel with the contacts 21; and the contacts 23 have connected therebetween a low resistor 46, in addition to which they are connected with the contacts 29 of the channel 12. The movable contacts 19 have connected therebetween a microammeter 47.

Referring more particularly to the third channel 12, as already stated, the contacts 29 are connected with the contacts 23 of the channel 11; the contacts 30 are tied together by a conductor 48; and the movable contacts 25 are connected in series with a second source 49 of D. C., a current limiting variable resistor 50, and a heating element 51, the latter being located remotely from the remainder of the instrument in contact with the thermally responsive element 32.

The contacts 26, 27, and 28 are free of any connections with the remainder of the instrument so that until the movable contacts 25 are engaged with the contacts 29, the third channel 12 remains an open circuit.

The meter 47 is preferably provided with four scales (not shown); one indicating voltage; another, current; a third, temperature; and the fourth, velocity.

This completes the description of the aforesaid illustrative embodiment of the present invention and the operation thereof may be briefly summarized as follows:

In instruments of this type it is obviously necessary that the input to the indicating circuits always be of the same magnitude, and in the present invention this condition is satisfied by manipulating the selector switch so that the movable contacts 13 become engaged with the fixed contacts 14, the movable contacts 19 become engaged with the fixed contacts 20, the movable contacts 25 become engaged with the fixed contacts 26.

With the device in this condition it will be noted that the bridge circuit 39, including the thermally responsive element 32, acts as a load across the source 37 of D. C., and the meter 47, having the high resistance 44 in series therewith, acts as a voltmeter to measure the potential across the bridge input. The variable resistor 36 may be adjusted so as always to assure said potential being constant.

The selector switch is then manipulated so that the movable contacts 13 become engaged with the fixed contacts 15, the movable contacts 19 become engaged with the fixed contacts 21, and the movable contacts 25 become engaged with the fixed contacts 27. The thermally responsive element 32 therefore becomes removed from the bridge circuit 39 and the low temperature coefficient of resistance element 33 becomes substituted therefor, while the meter 47 is now inserted in the bridge circuit to indicate the current flowing between the two parallel arms thereof. As previously indicated, the resistance of the element 33 should be equal to the resistance of the thermally responsive element 32 at the mean temperature of the range which it is desired to measure. In order to assure this condition, the variable resistor 41 in the bridge circuit is adjusted until the current flowing in said bridge circuit causes the deflection of the meter needle to a point corresponding to said mean value of the temperature range. The instrument is now ready to measure temperature.

In order to perform this function, the selector switch is manipulated so that the movable contacts 13 become engaged with the fixed contacts 16, the movable contacts 19 become engaged with the fixed contacts 22, and the movable contacts 25 become engaged with the fixed contacts 28.

Now the thermally responsive element 32 has been substituted for the low temperature coefficient of resistance element 33 and the meter 47 is still connected so as to indicate the current flowing in the bridge circuit. If the temperature of the air surrounding the thermally responsive element 32 is such that the resistance of said element is different from the resistance of the low temperature coefficient of resistance element 33, the current flowing in the bridge circuit will change in accordance with the deviation of the temperature being measured from the mean value of the range for which the device has been designed, and this deviation may be read upon a suitably calibrated scale. If the temperature being measured is above the mean temperature reference value, more current will be flowing in the bridge circuit, and if the temperature being measured is less than said mean temperature, less current will be flowing through the bridge circuit.

I shall now describe the manner in which the instrument may be used for measuring wind velocity.

With the selector switch in the position last described above, the variable resistor 41 in the bridge circuit is adjusted so as to balance the bridge and obtain zero deflection of the meter 47. This operation is performed in the air to be measured and the result is to compensate for the ambient temperature. The selector switch is now manipulated so that the movable contacts 13 engage the fixed contacts 17, the movable contacts 19 engage the fixed contacts 23, and the movable contacts 25 engage the fixed contacts 29. With the switch in this condition, the thermally responsive element 32 is still in the bridge circuit, the meter 47, by reason of its being shunted by the low resistance 46 has become an ammeter, and the circuit through the heater resistor 51 has become closed. The resistor 50 is now adjusted to permit a current flow through the heater resistor 51 of sufficient intensity to heat the thermally responsive element 32 to a temperature sufficient, if the device were in still air, to unbalance the bridge circuit 39 and obtain full scale deflection, this point corresponding to zero velocity.

The selector switch is again manipulated so that the movable contacts 13 engage the fixed contacts 18, the movable contacts 19 engage the fixed contacts 24, and the movable contacts 25 engage the fixed contacts 30.

With the device in this condition, the thermally responsive element 32 is still exposed to the wind, the velocity of which it is desired to measure and the meter 47 is reconnected into the bridge circuit. The moving air will carry heat away from the thermally responsive element, as a result of which the resistance thereof will become lower, thereby tending to balance the bridge and permitting less current to flow therein. The magnitude of said current flow will be an inverse function of the cooling power of said wind, or the velocity thereof. A properly calibrated scale therefore may be employed to translate this change in current flow into terms of velocity.

This completes the description of the mode of operation of the present invention. It will be noted from all of the foregoing that I have provided a temperature and wind velocity measuring device which consists of a combination of standard electrical instruments arranged in a simple electrical circuit, the entire apparatus being very compact, of very little weight, and being easy and inexpensive to manufacture, assemble and operate.

Other objects and advantages of the device of the present invention will readily occur to those skilled in the art to which the same relates.

I claim:

An instrument for measuring wind velocity comprising, in combination, a bridge circuit, a source of D. C. connected across said bridge circuit, an indicating device for determining the unbalance current flowing in said bridge circuit, a thermally responsive resistance element connected in said bridge circuit, means for adjusting any unbalance current initially flowing in said bridge circuit to zero at the ambient temperature, means for heating said thermally responsive element to a temperature sufficient to unbalance said bridge circuit and obtain a reference current flow corresponding to zero wind velocity, and means for determining any deviation from said reference current flow upon exposing said thermally responsive element to the cooling power of the wind to be measured, said indicating device being calibrated so that the current flowing in said bridge circuit as a result of exposing said thermally responsive element to the cooling power of the wind to be measured may be read in terms of velocity.

LEON HILLMAN.